United States Patent [19]

Dubois et al.

[11] 4,220,055
[45] Sep. 2, 1980

[54] DEVICE TO BALANCE A ROTOR

[75] Inventors: Claude Dubois, Vert St. Denis; Jean M. Surdi, Melun, both of France

[73] Assignee: Societe Nationale d'Etude et de Construction de Moteurs d'Aviation, Paris, France

[21] Appl. No.: 944,206

[22] Filed: Sep. 20, 1978

[30] Foreign Application Priority Data

Sep. 23, 1977 [FR] France ............................ 77 29241

[51] Int. Cl.² ............................................ F16F 15/22
[52] U.S. Cl. ................................................. 74/573 R
[58] Field of Search .............. 74/572, 573 R; 415/119

[56] References Cited

U.S. PATENT DOCUMENTS

| | | | |
|---|---|---|---|
| 1,158,712 | 11/1915 | Nichols | 74/573 |
| 1,422,633 | 7/1922 | Sterrett | 74/573 |
| 1,752,819 | 4/1930 | Tietz | 74/573 |
| 1,874,712 | 8/1932 | Sponable | 74/573 |
| 3,813,185 | 5/1974 | Bouiller et al. | 416/198 |

Primary Examiner—Kenneth Dorner
Attorney, Agent, or Firm—Bacon & Thomas

[57] ABSTRACT

The invention concerns balancing devices for rotating mobile pieces, using balancing weights attached as necessary to one of several collars. Each balancing weight has a beak engaging a groove of a collar and is secured to the rotor by a suitable fastener, such as a rivet. Following balancing, a ring abutting against the grooved face of the collar is set in place. The ring is equipped with uniformly distributed recesses each intended to form a socket for a balancing weight and one of the ends of its fastener, so as to prevent the ejection of any of these elements in case of a failure of the means of fixation. The ring cooperates with the rotor in forming a chamber, to retain the other end of the fastener. The invention is applicable to the balancing of any rotating mobile piece and particularly to that of the rotors of axial compressors.

3 Claims, 2 Drawing Figures

DEVICE TO BALANCE A ROTOR

BACKGROUND OF THE INVENTION

The present invention concerns a balancing device for a rotating member by means of weights, attached when required to compensate for the effects of an unbalance. In the known balancing devices, which the present invention proposes to improve, the rotor is equipped, for example, at both of its ends, with a collar forming a planar crown, coaxial with said rotor and in which a series of holes are uniformly distributed, said holes being intended to receive a means for the securing of a balancing weight. The collar may be machined out between the holes in order to lighten the structure. The necessary balancing weights are secured to the collar by means easily applied, bolts, screws or more recently, by rivets. Such securing means are always susceptible to failure which results over a shorter or longer period of time either in the ejection of the weight during rotation or to its dropping off when at rest.

SUMMARY OF THE INVENTION

An object of this invention is to improve the reliability of this type of device by providing a safety system assuring the maintenance in place of the weights in case of a failure of their means fastening them to the rotor. It is particularly applicable to rotating elements of turbine engines such as turbojet engines used in aircraft and especially to the balancing of axial type compressor rotors.

The invention proposes a balancing device by means of balancing weights comprising a safety system which assures the maintenance in place of said weights in case of a failure of their fastening means.

According to the invention, an annular groove is provided in one planar face of a rotor collar, said groove being coaxial with the collar. Each balancing weight comprises a flat part resting on the grooved face of the collar, equipped with a rib which protrudes and engages the groove, once the balancing weight is set in place. Each weight also comprises a hole coincident with one of the holes of the collar to receive a means of fixation. Following the setting place and the securing of the balancing weights, a ring having a flat face is placed on the rotor to rest on the grooved face of the collar, but equipped with recesses facing the holes so as to form sockets for the balancing weight. The sockets are dimensioned so that on the one hand any axial displacement leading to the disengagement of the rib from the groove of the collar, is prevented, thus keeping the balancing weight from leavings its socket in case of a failure of its securing means, and on the other hand, possible circumferential displacements of the rib of the weight through slipping are reduced to a minimum. This arrangement assures the maintenance in position of balancing weights in case of the failure of their principal means of fastening, both during rotation and at rest; they also aid in maintaining an adequate balance of the rotor. In order to prevent the ejection of the fastening means, or its fragments, in case of failure, it is of advantage to design the ring so that in the first instance each socket covers the end of the fastening means engaging the weight by limiting possible axial movements by said end, and in the second instance, it forms, together with the rotor, a chamber to retain the other end.

The balancing device according to the invention appears to be particularly advantageous in the case of axial type compressors to the extent that the retaining ring for the weights may also have another function. Specifically, the ring may consist of a modification of the annular support of a labyrinth joint located at the end of the rotor which is well known. In this case, the securing of the balancing weights to the rotor in keeping with the present invention permits the removal of the support for the labyrinth joint without disturbing the balance of the rotor itself. The failure of one of the securing means does not constitute a dangerous potential defect, since the ring may be removed to release the weight, which is then set in place with new fastening means.

BRIEF DESCRIPTION OF THE DRAWINGS

The description which follows herein below with reference to the figures attached hereto, more particularly concerns the application of the fastening means according to the invention to an axial type compressor rotor used particularly in jet engines.

DESCRIPTION OF THE PREFERRED EMBODIMENT

The compressor comprises a rotor 1 on which blades 2 are mounted, with the roots 3 of said blades engaging the grooves 4 of the rotor, so as to form a dovetail type assembly insuring the radial immobilization of the blades with respect to the rotor. The axial immobilization of the blades in the grooves is assured by clasps, balls, pins, or braces as is well known. In the particular case of FIG. 1, axial immobilization is by braces, i.e. the blades of the different stages of the compressor are separated by braces, upon which they rest with their roots 3, with the rotor having a downstream ring against which the downstream faces of the roots of the blades of the downstream stage abut and a second ring at the upstream end against which the upstream faces of the roots of the blades of the upstream stage abut, so as to assure the locking in place of the assembly. At least one of the rings is removably fastened to the rotor.

Such an arrangement of the fastening of blades is described in connection with a light rotor made of a fibrous material, is described in French Pat. No. 2,143,561, in the name of the present applicant.

Figure 1:
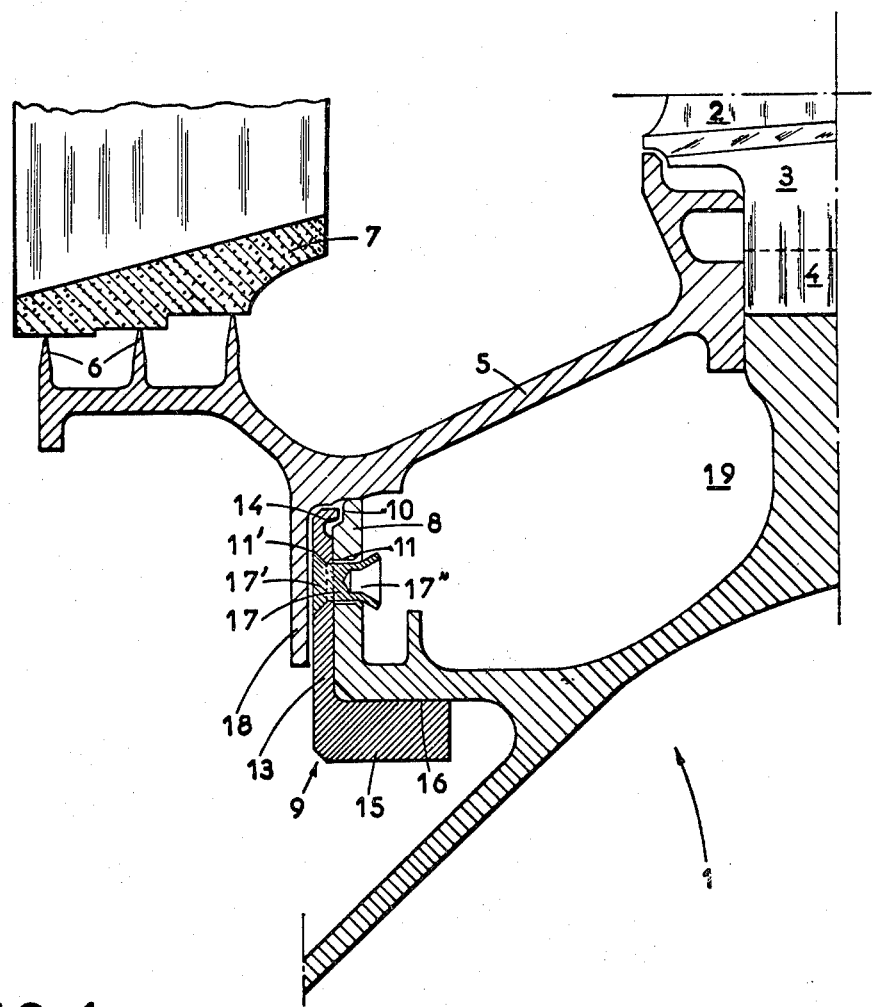
FIG. 1 is a partial section on an axial plane, of one of the ends of a compressor embodying the present invention.

In FIG. 1, the upstream ring, for example, is represented by numeral 5, said ring 5 also constituting a support for tongues which cooperate with an element 7, stationary, for example, to form a tight joint or seal of the labyrinth type. The ring 5 is removably fastened to the rotor by means of screws or bolts, not shown, which are distributed uniformly with respect to an axis parallel to that of the rotor.

In certain known embodiments, balancing masses are mounted on the ring 5, and in case of removal of the ring, the rotor must be rebalanced after remounting the ring. Among other advantages, the present invention eliminates this operation by providing a direct attachment of the balancing weights to the rotor 1.

Figure 2:
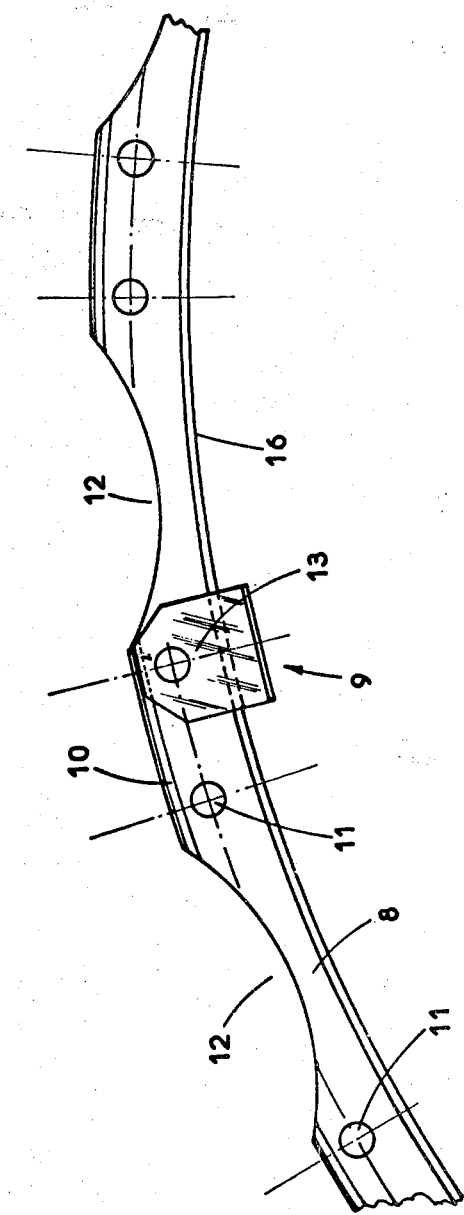
FIG. 2 is a view, on a reduced scale, of the end of the compressor in a transverse plane, showing the collar to which the balancing weights are fastened.

For this purpose, the rotor has an annular collar 8, which is coaxial with it, and which forms an essentially flat crown. In the planar face of the collar 8, against which the weights, such as 9, are placed, an annular groove 10, coaxial with the collar, is provided. The collar 8 is provided with holes 11, distributed at equal intervals and intended for the passage of the fastening means for the balancing weights, said collar having a series of uniformly spaced cuts, such as 12, between the holes, in order to lighten it (FIG. 2).

Each balancing weight 9, shown in a plane containing the axis of the rotor, has in the particular case chosen, the sectional shape of an angle iron, or L-shaped. The part 13 of the weight 9 extends transversely with respect to the axis of the rotor, and has a planar face resting against the flat, grooved face of the collar 8. From this planar face of the balancing weight, a rib 14 protrudes, acting as a beak in engaging the groove 10, once the weight is in place. The part 13 also has a hole 11', which is made to coincide with the hole 11 for the passage of the fastening means. The part 15 of the weight extending axially, rests against the inner annular surface 16 of the collar and for this purpose is provided with a cylindrical surface coaxial with the surface 16.

A balancing weight in place is thus immobilized by its fastening means 17, which in the figure consists of a single rivet. The cooperation of the part 15 of the balancing weight with the surface 16 of the collar insures the immobility, in rotation, of the weight around the axis of its fastening means.

The manufacture of the balancing weights used is particularly simple; different masses are obtained by varying the volume of the part 15. The shape of the balancing weights affords, independently of additional means, the assurance of safety comparable to that obtained with the known devices of securing the weights. Nevertheless, in order to account for a potential failure of the fastening means and to assure the maintenance in place of the weight in case of the breaking of said means, an additional safety device is provided. For this purpose, the ring 5 comprises a part 18 provided with an annular face, butting against the grooved face of the collar 8. Sockets are arranged in said part 18 opposite the holes 11 of the collar. The sockets are of a shape which prevents any axial movement of the weight, which might result in the disengagement of the rib 14 from the groove 10. It follows that the weight will remain in position even in case of the failure of its fastening means 17. The width of the socket is also limited to prevent any movement of the weight in the circumferential direction by a slippage of the rib 14 in the groove 10.

It should be noted that the dimension measured in the radial direction of the part 18 must be sufficiently large, at the sockets, to retain the end 17' of the fastening means 17, flush with the weight, so that said end 17' is also retained in case of a failure of the fastening means 17. The ring 5 is in addition, designed so as to form in cooperation with the rotor 1 a chamber 19, which retains the other end 17" of the fastening means 17 in case of failure of the rivet.

The fastening device according to the invention is thus particularly advantageous to the extent that it retains the balancing weight in place in case of the failure of the principal fastening means, both in operation and at rest, and it prevents the ejection of the fragments of the fastening means if fractured in operation, and finally, it provides for the removal of the support of the labyrinth joint without disturbing the balance of the rotor itself.

We claim:

1. In a balancing device for a rotor having a flange defining a flat radial surface with a series of spaced orifices to receive fastening means for balancing weights, and a radially inwardly facing cylindrical surface on said flange, the improvement comprising:

an annular groove in said radial surface of said flange;

a balancing weight of L-shape cross section having one leg extending generally radially along said radial surface and having a rib extending into said annular groove, a hole through said one leg aligned with one of said orifices with a fastening means extending through both, the other leg of said balancing weight extending axially and having a cylindrical surface facing radially outwardly and engaging said inwardly facing cylindrical surface; and a ring on said rotor facing said radial surface and having a recess receiving said one leg of said balancing weight and overlying said fastening means whereby, in the event of failure of said fastening means, said rib and ring will retain said weight in position on said rotor.

2. A balancing device as defined in claim 1 wherein said ring and said flange are carried by parts of said rotor which define a chamber on the side of said flange opposite said weight, to receive and retain a fragment of a failed fastening means.

3. A balancing arrangement as defined in any one of claims 1 or 2 wherein said rotor is the rotor of a compressor for a turbine engine, said ring also supporting elements cooperating with a stationary part of said compressor to define a labyrinth seal between said stationary part and said rotor.

* * * * *